United States Patent
Yu et al.

(10) Patent No.: US 8,582,904 B2
(45) Date of Patent: Nov. 12, 2013

(54) METHOD OF SECOND ORDER PREDICTION AND VIDEO ENCODER AND DECODER USING THE SAME

(75) Inventors: Lu Yu, Hangzhou (CN); Sijia Chen, Hangzhou (CN); Jianpeng Wang, Hangzhou (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 758 days.

(21) Appl. No.: 12/738,205

(22) PCT Filed: Oct. 14, 2008

(86) PCT No.: PCT/CN2008/001728
§ 371 (c)(1),
(2), (4) Date: Jul. 19, 2010

(87) PCT Pub. No.: WO2009/052697
PCT Pub. Date: Apr. 30, 2009

(65) Prior Publication Data
US 2010/0310184 A1    Dec. 9, 2010

(30) Foreign Application Priority Data
Oct. 15, 2007    (CN) .......................... 2007 1 0181975

(51) Int. Cl.
*H04N 7/12* (2006.01)
(52) U.S. Cl.
USPC ..................................... 382/238; 375/240.12
(58) Field of Classification Search
USPC ........ 382/233, 236, 238; 375/240.12, 240.13, 375/240.14, 240.15
See application file for complete search history.

(56) References Cited

U.S. PATENT DOCUMENTS

2007/0047644 A1    3/2007  Lee et al.
2007/0223886 A1*   9/2007  Bourge et al. ................. 386/109

FOREIGN PATENT DOCUMENTS

| | | |
|---|---|---|
| CA | 2615647 A1 | 1/2007 |
| CN | 1954613 A | 4/2007 |
| CN | 101137065 A | 3/2008 |
| JP | 7240944 A | 9/1995 |
| JP | 9098427 A | 4/1997 |
| WO | WO2006125713 A2 | 11/2006 |

OTHER PUBLICATIONS

Kenneth Andersson, Combined Intra Inter-prediction Coding Mode, ITU-Telecommmunications Standardization Sector, Video Coding Experts Group, VCEG-AD11, Oct. 18, 2006.

* cited by examiner

*Primary Examiner* — Andrew W Johns
(74) *Attorney, Agent, or Firm* — Jacobson Holman PLLC; Jiwen Chen

(57) ABSTRACT

A method and apparatus for second order prediction are provided. In the decoding method, the reconstruction of decoded picture comprises second order prediction and compensation and second prediction storage. The second order prediction and compensation comprises first prediction and compensation and second prediction and compensation, input of which includes reconstructed first order residue and second order residue. The encoding method comprises second order prediction and second prediction storage. Second order prediction consists of first prediction and second prediction, input of which includes reconstructed first order residue and second order residue, and it will generate bit-stream accordingly. This invention will eliminate redundancy using second order prediction encoding and decoding method, so that coding efficiency will be improved.

11 Claims, 6 Drawing Sheets

METHOD OF SECOND ORDER PREDICTION AND VIDEO ENCODER AND DECODER USING THE SAME

This is a U.S. national stage application under 35 U.S.C. 371 of PCT/CN2008/01728, filed on Oct. 14, 2008 and published in Chinese, claiming priority from Chinese Application No. 200710181975.9, filed Oct. 15, 2007.

FIELD OF THE INVENTION

Methods and apparatuses consistent with the present invention relate to digital signal processing technique, and more particularly, to second order prediction video coding method and codec.

BACKGROUND OF THE INVENTION

Spatial domain DPCM (differential pulse code modulation), which acted as the prototype of the coding method for digital image and video signal, could be traced back to 1950s. Afterwards in the 1970s, transform coding and motion compensated prediction came into existence. In 1974, Ahmed introduced a block based two dimensional discrete cosine transform (DCT), which now becomes a key technique in the current advanced video coding structure. After all these techniques became mature and practical in the 1980s, a block based hybrid coding structure, which consists of predictive coding, transform coding and entropy coding, is formed. In the next two decades, a series of international coding standards are established, such as H.261, H.263 and H.26L formulated by ITU and MPEG-1, MPEG-2 and MPEG-4 by MPEG of ISO. When it comes to the $21^{st}$ century, with the advancement of the technology, more efficient coding technique and network adapting method are required to satisfy customers' need for multimedia communication. Under such circumstance, a new generation of video coding standard H.264/MPEG-AVC (H.264) is formulated and issue by the end of 2003. Meanwhile, Chinese self-owned intellectual property rights video coding standard AVS part 2 had been formulated at the end of 2003 and issue as formal standard of China (GB/T 20090.2) at February 2006. The coding efficiency of AVS and H.264 is almost 2 times as that of MPEG-2 while at the cost of computational complexity. Moreover, both of AVS and H.264 are based on the traditional hybrid coding structure.

The essential objective of video coding is to compress the video signal, eliminate redundant data, so that extra memory storage and transmission bandwidth could be saved. The total amount of data of the original video signal is enormous. One frame of CIF size YUV image, for instance, which has 352× 288 pixels and formatted as 4:2:0, will cost 1216512 bits to represent if one luma or chroma pixel is denoted by 8 bits. Suppose that video is displayed with 25 frame per second, bit rate would be as high as 30.4 Mbps. This would be even higher for standard definition and high definition video sequence. It is of considerably difficulty to achieve such a high bit rate in transmission and storage so that efficient video compression techniques are necessary to guarantee video communication and storage. Fortunately, in video signal there exist huge amount of redundant information, which mainly includes spatial redundant information, temporal redundant information, data redundant information and visual redundant information. While the first three only consider redundant information between pixels, which could be categorized as pixels based statistical redundant information, the last one mainly focus on the characteristic of human visual system. The important objective of video coding is to eliminate redundant information and compress the video signal. Consequently, aiming at eliminating the redundant information between each pixels, hybrid coding structure based on predictive coding, transform coding and entropy coding is introduced. Its feature includes:

1) Utilize predictive coding to eliminate temporal and spatial redundancy;
2) Utilize transform coding to further eliminate spatial redundancy;
3) Utilize entropy coding to eliminate data redundancy;

Traditional predictive coding in hybrid coding structure includes intra-prediction and inter-prediction (please refer to H.264/AVC and AVS standard). The former one consists of pixel domain prediction and transform domain prediction, both of them constitute the spatial domain prediction. The video frame that applies intra-prediction is called intra-coding frame (I frame). It applies the following procedure: first, frame is divided into blocks (one form of coding unit); applies intra-prediction to coding blocks, and prediction error is obtained according to the different block size and prediction mode; prediction error is transformed; applies quantization to transformed coefficient in the transform domain; transform the 2 dimensional signal into 1 dimension by scanning; entropy coding. The video frame that applies inter-prediction is called inter-coding frame, and it includes forward, backward and bidirectional prediction (P frame and B frame), both of which could be applied to various block size. It applies the following procedure: first, frame is divided into blocks; applies motion estimation techniques of motion search and motion prediction to obtain a motion vector and a reference block (one form of reference block); applies motion compensation and obtained prediction error of inter-prediction (temporal prediction). Moreover, there are several temporal-spatial coding techniques (please refer to Kenneth Andersson, "Combined Intra Inter-prediction Coding Mode", VCEG-AD11, 18 October 2006). prediction error is transformed; applies quantization to transformed coefficient in the transform domain; transform the 2 dimensional signal into 1 dimension by scanning; entropy coding. The spatial and temporal redundancy exist in prediction error is drastically reduced compare with that of original video signal. If this spatial and temporal redundancy could be quantized as correlation in mathematics, the spatial and temporal correlation of prediction error is small compare with original video signal. Applying two dimensional transform will further reduced the spatial correlation and in the end transformed coefficient should be quantized and entropy coded to eliminate data redundancy. As a result, more accurate predictive coding techniques will help to reduce the spatial and temporal correlation of prediction error and thus lead to efficient compression; more efficient transform coding techniques is needed to reduce temporal correlation; after the predictive coding and transform coding, more suitable scanning, quantization and entropy coding technique should be designed.

To handle with the bottleneck of the traditional hybrid coding structure, there is still redundancy exist in prediction error after the spatial and temporal prediction. Further elimination of such redundancy will help to improve the coding efficiency.

SUMMARY OF THE INVENTION

An aspect of the present inventions is to provide a method called Second Order Prediction for reducing the correlation exist in prediction error.

Another aspect of the present invention is to provide an improved video encoder and video decoder employing the method.

These and other aspects of the present invention will be described in or be apparent from the following description of exemplary embodiments of the invention.

According to an exemplary embodiment of the present invention, there is provided a video decoding method including second order prediction storage and second order prediction, which consists of first prediction and second prediction and compensation. Input of second order prediction includes first order residue and second order residue.

According to another exemplary embodiment of the present invention, there is provided a video encoding method including second order prediction storage and second order prediction, which consists of first prediction and second prediction and compensation. Input of second order prediction includes first order residue and second order residue. This encoding method will generate bit stream.

According to still another exemplary embodiment of the present invention, there is provided a video decoder including means for second prediction which inputs reconstructed second order residue and reconstructed first order residue from second prediction storage and outputs reconstructed first order residue, means for second order prediction storage, which inputs and outputs reconstructed first order residue, means for first prediction, which inputs reconstructed first order residue and first order mode and output reconstructed frame.

According to yet another exemplary embodiment of the present invention, there is provided a video decoder including means for first prediction, which inputs original frame and reconstructed frame and outputs first order residue and first mode, means for second prediction, which inputs reconstructed first order residue and first order residue from second prediction storage and outputs second order residue, means for second order prediction storage, which inputs and outputs reconstructed first order residue.

BRIEF DESCRIPTION OF THE DRAWINGS

The above and other aspects of the present invention will become more apparent by describing in detail exemplary embodiments thereof with reference to the attached drawings in which.

DETAIL DESCRIPTION

Figure 1:
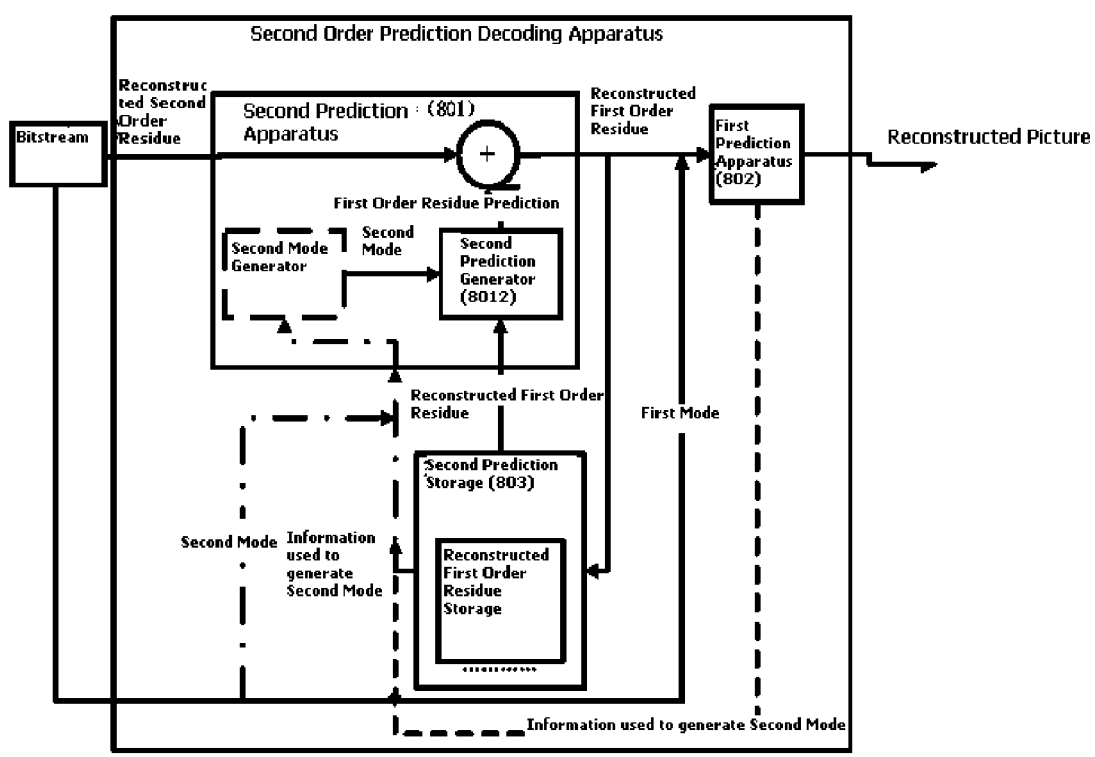
FIG. 1 is an exemplary diagram illustrating a second order prediction decoder
Figure 2:
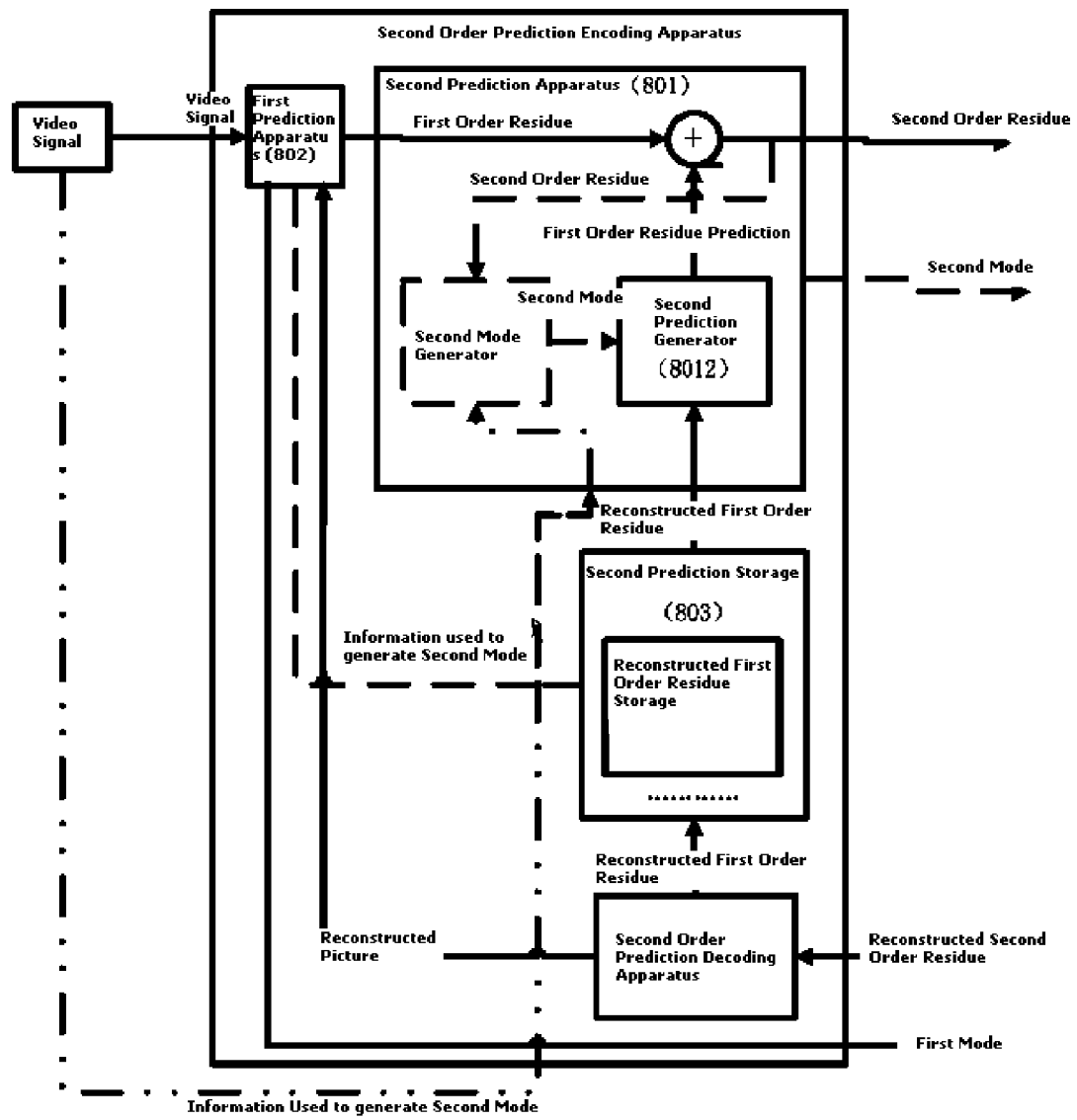
FIG. 2 is an exemplary diagram illustrating a second order prediction encoder
Figure 3:
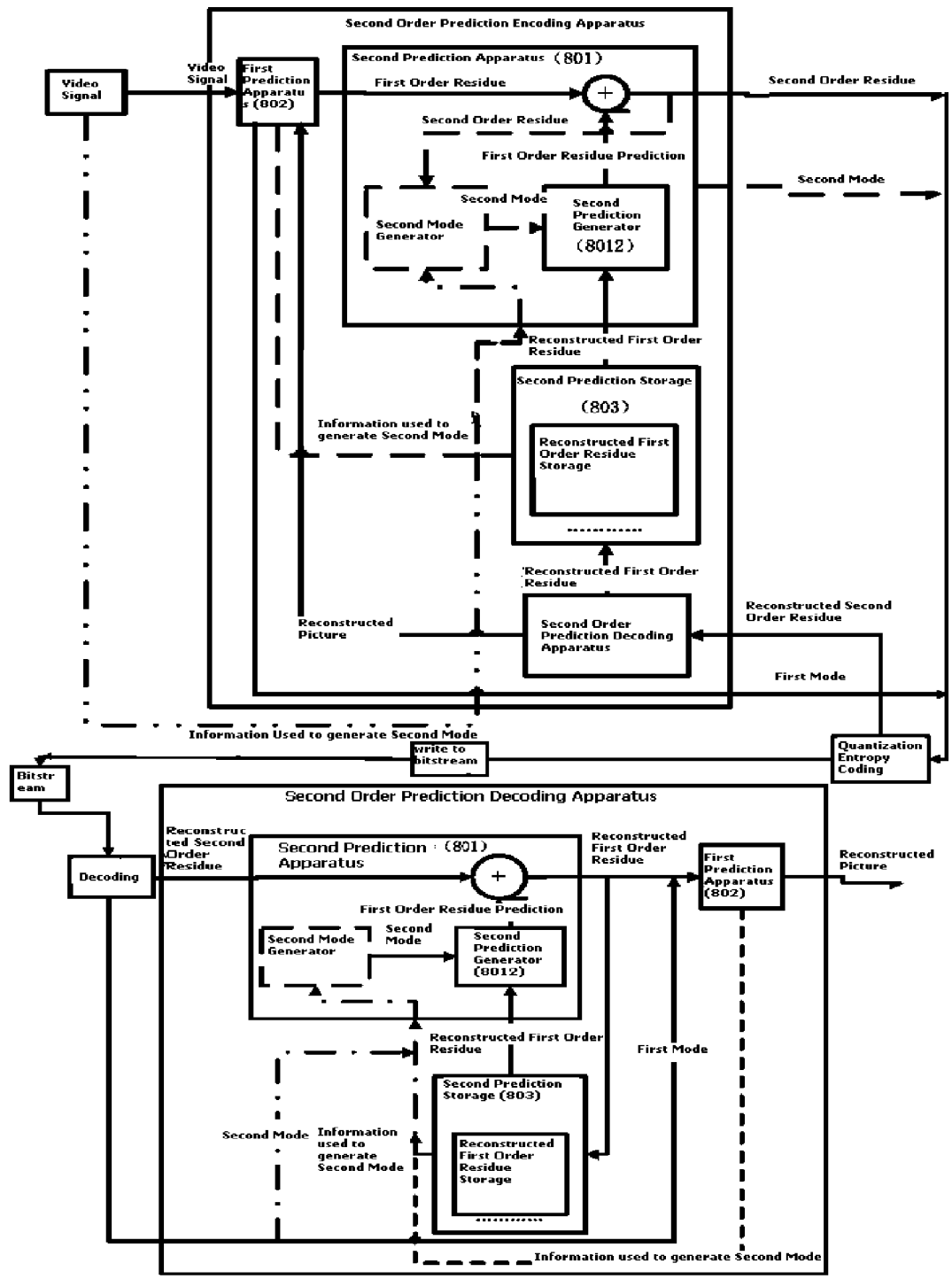
FIG. 3 is an exemplary diagram illustrating a second order prediction encoder and decoder FIG. 4 illustrate an N×M block of original data FIG. 5 illustrate an N×M block of reference picture data

Exemplary embodiments of the present invention will now be described more fully with reference to the accompanying drawings, in which exemplary embodiments of the invention are shown. Various advantages and features of the present invention and methods of accomplishing the same maybe understood more readily by reference to the following detailed description of exemplary embodiments and the accompanying drawings. The present invention may, however, be embodied in many different forms and should not be constructed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The following statement list some examples of the definition and method mentioned above.

A. Examples of Unit to be Processed a) Coding unit is a set composited of video pixels, and pixels belong to the same coding unit need to be coded together. In the early DPCM system, coding unit is each individual pixels; while it becomes rectangular blocks in coding standard, square is also included; in some recent papers on the coding techniques, coding unit could be triangular or trapezoid.

b) There are various types of coding units, and besides those mentioned above, it could consists of pixels that are not adjacent to each other. Coding block is a specific example of coding unit, it is a rectangular block formed by pixels, and the size of it could be n×m, representing that the height of the block is n pixels and the width m pixels. For instance, there are 16×16 coding block, 16×8 coding block, 8×16 coding block, 8×8 coding block, 8×4 coding block, 4×8 coding block and 4×4 coding block. In present invention, coding block will be used in the exemplary embodiments. As a result, with no specific instruction, coding unit will be replaced by coding block.

c) Same as the coding unit, decoding unit is the same thing in the system but with different location and name. Coding units is the definitions in second order prediction encoding system. While the data of the coding unit is transmitted to the second order prediction decoding system, it is called as decoding unit. So the instruction above could also be applied to the decoding unit.

d) Both of the coding and decoding unit could be seen as the unit to be processed.

B. Examples of Signal a) Original Picture Data

Figures 4, 5:
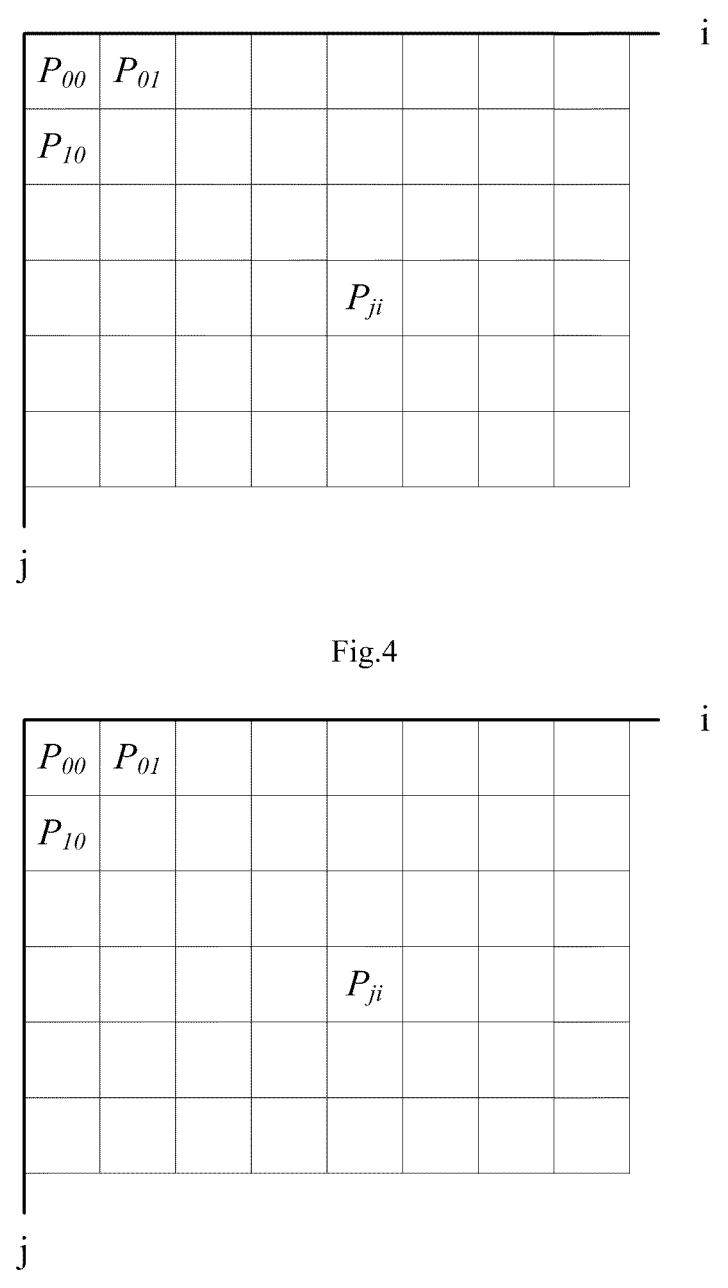

The original data of the unit to be processed refers to the original pixel values of the unit to be processed. FIG. 4 illustrate a N×M block to be processed denoted by P, in which $P_{ji}$ denotes the pixel value at location (j, i). This is the original data of this pixel. We take this n×m block of original data to be the input of the video processing system.

b) Reference Unit Data

When applied temporal prediction or spatial prediction to the processing unit, we need to find a most resembled unit in the reference picture to match the current processing unit, and it is called matching unit. Most resembled here means some measurements (for example, SAD) are optimized. When the spatial prediction and motion compensation of temporal prediction use sub-pixel accuracy, matching unit could be either the integer pixel of the reference picture or sub-pixel by interpolation. Here reference picture data refers to the matching unit, and when sub-pixels are not available, it could be the integer pixels that best matches the processing unit. FIG. 5 illustrates a reference picture data as an unit to be processed. It is an integer matching block R with size N×m. $R_{ji}$ refers to the pixel value at location (j,i).

c) First Order Residue

A combination of n×m processing unit data of integer pixel matching block and its correspondent original data will produced first order residue.

d) First Order Mode

It consists of first predictive mode and motion information, quantization parameter and some other related information.

e) First Order Residue Prediction

It could be obtained from the reconstructed first order residue previously stored by second order prediction.

f) Second Order Residue

The difference between the first order residue and the First order residue prediction of N×M unit is the second order prediction.

g) Second Order Mode

It consists of first predictive mode and motion information, or information that are used to derive the second order mode but not belongs to the above signals, and some other related information.

C. Examples of Ways to Produce First Order Residues in Second Order Prediction Decoding:

a) Spatial prediction b) Temporal prediction c) Spatial and temporal prediction d) Prediction method that exist in background of invention, not limited to the examples here.

D. Examples of Ways to Derive Second Order Mode in Second Order Prediction Encoding and Decoding Method a) Using information from current processing unit
   i. Using predefined value in the current processing unit;
   ii. Using prediction value correspondent to the pixel value of the current processing unit
   iii. Using first order mode of the current processing unit
   iv. Using first order residue prediction value of the current processing unit
   v. Using reconstructed second order residue of the current processing unit
   vi. In the encoder side, using second order residue of the current processing unit
   vii. In the decoder side, using the second order mode syntax element of the current processing unit in the bit-stream
   viii. Using the several information mentioned above or the combination of them b) Using information from neighboring unit of current processing unit
   i. Using predefined value in the neighboring unit of current processing unit;
   ii. Using reconstructed picture pixel value of the neighboring unit of current processing unit;
   iii. Using prediction value correspondent to the neighboring unit pixel value of the current processing unit
   iv. Using reconstructed first order residue prediction value of the neighboring unit of current processing unit
   v. Using first order residue prediction value of the neighboring unit of current processing unit
   vi. Using first order mode of the neighboring unit of current processing unit
   vii. Using reconstructed second order residue of the neighboring unit of current processing unit
   viii. Using second order mode of the neighboring unit of current processing unit
   ix. Using the several information mentioned above or the combination of them c) Using information from available reference picture of the current picture in which current processing unit located
   i. Using predefined value of related unit in the available reference picture of the current picture in which current processing unit located
   ii. Using reconstructed picture pixel value of related unit in the available reference picture of the current picture in which current processing unit located
   iii. Using picture pixel prediction value of related unit in the available reference picture of the current picture in which current processing unit located
   iv. Using reconstructed first order residue of related unit in the available reference picture of the current picture in which current processing unit located
   v. Using first order residue prediction value of related unit in the available reference picture of the current picture in which current processing unit located
   vi. Using first order mode of related unit in the available reference picture of the current picture in which current processing unit located
   vii. Using second order residue of related unit in the available reference picture of the current picture in which current processing unit located
   viii. Using second order mode of related unit in the available reference picture of the current picture in which current processing unit located
   ix. Using the several information mentioned above or the combination of them d) Using several information from a), b), c) or combination of them:
   i. Using information from a) and c)
      By calculating a specific parameter (directional function in exemplary embodiments) of the picture pixel prediction value of the current processing unit, and comparing with that of the related unit in the available reference picture of the current picture in which current processing unit located, a second order mode could be produced. There is no restriction of whether to have second order mode syntax element in the bit-stream. The present invention may, however, be embodied in many different forms and should not be construed as being limited to the exemplary embodiments set forth herein.
   ii. Using information from a), b) and c) could be deduced from the above instruction. There is no restriction of whether to have second order mode syntax element in the bit-stream.
   iii. Using combination of information from a) and c)
      By calculating a specific parameter (directional function in exemplary embodiments) of the picture pixel prediction value of the current processing unit and that of the related unit in the available reference picture of the current picture in which current processing unit located, a function value could be calculated. By comparing this value with the predefined value of the current processing unit, a second order mode could be produced. There is no restriction of whether to have second order mode syntax element in the bit-stream. The present invention may, however, be embodied in many different forms and should not be construed as being limited to the exemplary embodiments set forth herein.

iv. Using combination of information from a), b) and c) could be deduced from the above instruction. There is no restriction of whether to have second order mode syntax element in the bit-stream.

The technical proposal of present invention is illustrated as follow:

1. A second order prediction decoding method, which comprising of following steps:
   1) Reading information from bit-stream for the use of decoding. The information should consists of one of following encoding information:
      (1) First order mode and second order residue, not including first order residue
      (2) First order mode, second order mode and second order residue, not including first order residue
   2) Realizing second prediction and compensation in the second prediction apparatus:
      (1) Obtaining second order mode
         The claimed second order mode could be derived from the any information or combination of them at any location list below
         Location:
         (1) Current processing unit
         (2) neighboring unit of current processing unit
         (3) available reference picture of the current picture in which current processing unit located
         Information:
         (1) predefined value
         (2) reconstructed picture pixel value
         (3) picture pixel prediction value
         (4) reconstructed first order residue
         (5) first order residue prediction value
         (6) first order mode
         (7) reconstructed second order residue
         (8) second order mode
         (9) second order mode syntax elements in the bit-stream
      (2) deriving first order residue prediction value
         First order residue prediction value is derived by reconstructed first order residue using prediction according to the second prediction mode. Such prediction could be spatial or temporal prediction or combination of them. The above derivation of first order residue prediction value is called second prediction.
      (3) Deriving reconstructed first order residue from reconstructed second order residue and first order residue prediction value
      (4) Sending reconstructed first order residue to the second prediction storage
   3) Realizing first prediction and compensation in the first prediction apparatus: outputs first order residue, reconstructed the picture and outputs as decoded picture
   4) Second prediction storage:
      (1) When spatial prediction is applied to derive first order residue prediction value, part or all of reconstructed first order residue of the neighboring unit of the current processing unit is stored in the second prediction storage.
      (2) When temporal prediction is applied to derive first order residue prediction value, reconstructed first order residue of the available reference picture of the current picture in which current processing unit located.
      (3) When spatial and temporal prediction is applied to derive first order residue prediction value, part or all of reconstructed first order residue of the neighboring unit of the current processing unit is stored in the second prediction storage, so is reconstructed first order residue of the available reference picture of the current picture in which current processing unit located.

2. A second order prediction encoding method, which comprising of following steps:
   1) Realizing first prediction in the first prediction apparatus: outputs first order residue to the second prediction apparatus and first order mode to entropy coding
   2) Realizing second prediction in the second prediction apparatus:
      (1) deriving first order residue prediction value
         First order residue prediction value is derived by reconstructed first order residue using prediction according to the second prediction mode. Such prediction could be spatial or temporal prediction or combination of them. The above derivation of first order residue prediction value is called second prediction.
      (2) Deriving second order residue by first order residue and first order residue prediction value, at least include one of the following circumstance
         a. Obtaining second order mode, deriving first order residue prediction according to this mode
         b. Deriving first order residue prediction, obtaining second order residue, deriving second order mode by second order residue and some other related information
         The claimed second order mode could be derived from the any information or combination of them at any location list below
         Location:
         (4) Current processing unit
         (5) neighboring unit of current processing unit
         (6) available reference picture of the current picture in which current processing unit located
         Information:
         (10) predefined value
         (11) reconstructed picture pixel value
         (12) picture pixel prediction value
         (13) reconstructed first order residue
         (14) first order residue prediction value
         (15) first order mode
         (16) reconstructed second order residue
         (17) second order mode
         (18) second order mode syntax elements in the bit-stream
      (3) Sending reconstructed first order residue to the second prediction storage
      (4) After transform, quantization and entropy coding that mentioned in the background of invention, an encoded bit-stream of second order residue is derived. This encoded bit-stream contains the coded information of the second order residue and could be either lossless or lossy encoding; after the reverse process mentioned above such entropy decoding, inverse transform and de-quantization, encoded bit-stream could be converted to reconstructed second order residue; The process of derivation of second order residue may, however, be embodied in many different forms and should not be constructed as being limited to the exemplary embodiments set forth herein. The output bit-stream of the encoder should consists of one of following encoding information:
a. First order mode and second order residue, not including first order residue
b. First order mode, second order mode and second order residue, not including first order residue
(5) When spatial prediction is applied to derive first order residue prediction value, part or all of reconstructed first order residue of the neighboring unit of the current processing unit is stored in the second prediction storage.
(6) When temporal prediction is applied to derive first order residue prediction value, reconstructed first order residue of the available reference picture of the current picture in which current processing unit located.
(7) When spatial and temporal prediction is applied to derive first order residue prediction value, part or all of reconstructed first order residue of the neighboring unit of the current processing unit is stored in the second prediction storage, so is reconstructed first order residue of the available reference picture of the current picture in which current processing unit located.

A second order prediction decoding apparatus using second order prediction decoding method comprising: means for second prediction (801), which inputs reconstructed second order residue decoded from bit-stream and reconstructed first order residue from second prediction storage (803) and outputs reconstructed first order residue; second prediction storage (803), which inputs reconstructed first order residue from means for second prediction (801) and outputs reconstructed first order residue; means for first prediction (802), which inputs reconstructed first order residue from means for second prediction (801) and first order mode decode from bit-stream and outputs reconstructed picture.

A second order prediction encoding apparatus using second order prediction encoding method comprising: means for first prediction (802), which inputs original picture and reconstructed picture and outputs first order residue and first order mode; means for second prediction (801), which inputs first order residue from means for first prediction (802) and reconstructed first order residue from second prediction storage (803) and outputs second order residue; second prediction storage (803), which inputs reconstructed first order residue and outputs reconstructed first order residue.

A second order prediction encoding and decoding apparatus using second order prediction encoding and decoding method comprising: a second order prediction decoding apparatus using second order prediction decoding method and A second order prediction encoding apparatus using second order prediction encoding method.

1 Exemplary embodiment 1: a second order prediction decoding method, comprising following procedure:
  1.1 Reading encoded information of second order residue, second order mode and first order mode from the bit-stream. After entropy decoding, inverse transform and de-quantization, reconstructed second order residue, second order mode (D-1-7) and first order mode will be obtained.
  1.2 Realizing second prediction and compensation in the second prediction apparatus:
    1.2.1 Applying spatial prediction (C-1) to the first order residue of the current processing unit;
    1.2.2 In current exemplary embodiment, second order mode include spatial prediction (C-1) such as horizontal prediction, vertical prediction, DC prediction, diagonal up left prediction, diagonal down right prediction and some other directional prediction as well; or it could be prediction with different block size and some other similar process. The second prediction mode should not be constructed as being limited to the set forth herein.
    1.2.3 If the prediction used to generate the first order residue prediction value is spatial prediction, up and left adjacent pixel of current processing unit in the current frame will be used to generate the first order residue prediction value according to the second order mode.
    1.2.4 Reconstructed second order residue and first order residue prediction value will be added to obtain the first order reside; reconstructed first order residue will be sent back to second prediction storage.
    1.2.5 The spatial prediction (C-1) should not be constructed as being limited to the set forth herein and can include some other similar process in the background of invention.
  1.3 According to the method introduced in the background of the invention, realizing first prediction and compensation in the first prediction apparatus and output reconstructed picture.
  1.4 If spatial prediction is applied to generate first order residue prediction value, reconstructed first order residue of the up and left adjacent pixel will be stored in the second prediction storage.

2 Exemplary embodiment 2: a second order prediction encoding method, comprising following procedure:
  2.1 Realizing first prediction in the first prediction apparatus: inputs the original picture, outputs first order residue to the second prediction apparatus and first order mode to encoder
  2.2 Realizing second prediction and compensation in the second prediction apparatus:
    2.2.1 Applying temporal prediction (C-2) to the first order residue of the current processing unit;
    2.2.2 In current exemplary embodiment, second order mode includes temporal prediction (C-2) such as forward prediction, backward prediction, bi-predictive prediction with variable block size; or it could be prediction with different block size and some other similar process. The second prediction mode should not be constructed as being limited to the set forth herein.
    2.2.3 If the prediction used to generate the first order residue prediction value is temporal prediction, reconstructed first order residue of the reference picture correspondent to the current processing block will be used to generate the first order residue prediction value using motion estimation.
    2.2.4 The difference of first order residue and first order residue prediction value is second order residue
    2.2.5 Mode decision for the second order mode (D-1-6): calculating the encoding cost of the available second order mode and selected the one with minimum cost. The method of calculating the encoding cost can refer to the background of the invention, and should not be constructed as being limited to the set forth herein.
    2.2.6 Encode the second order prediction mode into the bit-stream
    2.2.7 After transform, quantization and entropy coding, encoder will generated encoded bit-stream, which includes encoded information of first order mode, second order mode and second order residue but no first order residue. This encoded information is generated by lossy encoding. By inverse procedure, reconstructed second order residue could be obtained; the process of generating the bit-stream should not be constructed as being limited to the set forth herein.

2.2.8 The temporal prediction (C-2) should not be constructed as being limited to the set forth herein and can include some other similar process in the background of invention.

2.2.9 After second order decoding process, reconstructed first order residue will be obtained from reconstructed second order residue and sent back to second prediction storage.

2.3 If temporal prediction is applied to generate first order residue prediction value, reconstructed first order residue of the reference picture correspondent to the current processing unit will be stored in the second prediction storage.

3 Exemplary embodiment 2: a second order prediction encoding method, comprising following procedure:

3.1 Realizing first prediction in the first prediction apparatus: inputs the original picture, outputs first order residue to the second prediction apparatus and first order mode to encoder 3.2 Realizing second prediction and compensation in the second prediction apparatus:

3.2.1 Applying temporal prediction (C-2) to the first order residue of the current processing unit;

3.2.2 In current exemplary embodiment, second order mode includes temporal prediction (C-2) such as forward prediction, backward prediction, bi-predictive prediction with variable block size; or it could be prediction with different block size and some other similar process. The second prediction mode should not be constructed as being limited to the set forth herein.

3.2.3 If the prediction used to generate the first order residue prediction value is temporal prediction, reconstructed first order residue of the reference picture correspondent to the current processing block will be used to generate the first order residue prediction value using motion estimation.

3.2.4 The difference of first order residue and first order residue prediction value is second order residue 3.2.5 Using the neighboring unit of the current processing unit to obtain the second order mode of the current unit (D-2-8): count the second prediction mode of the neighboring unit, set the mode with biggest count number as the second order mode of the current unit; The method should not be constructed as being limited to the set forth herein.

3.2.6 Second order prediction mode will not be encoded into the bit-stream 3.2.7 After transform, quantization and entropy coding, encoder will generated encoded bit-stream, which includes encoded information of first order mode, second order mode and second order residue but no first order residue. This encoded information is generated by lossy encoding. By inverse procedure, reconstructed second order residue could be obtained; the process of generating the bit-stream should not be constructed as being limited to the set forth herein.

3.2.8 The temporal prediction (C-2) should not be constructed as being limited to the set forth herein and can include some other similar process in the background of invention.

3.2.9 After second order decoding process, reconstructed first order residue will be obtained from reconstructed second order residue and sent back to second prediction storage.

3.3 If temporal prediction is applied to generate first order residue prediction value, reconstructed first order residue of the reference picture correspondent to the current processing unit will be stored in the second prediction storage.

4 Exemplary embodiment 4: a second order prediction decoding method, comprising following procedure:

4.1 Reading encoded information of second order residue and first order mode from the bit-stream. After entropy decoding, inverse transform and de-quantization, reconstructed second order residue, and first order mode will be obtained.

4.2 Realizing second prediction and compensation in the second prediction apparatus:

4.2.1 Applying spatial prediction (C-1) to the first order residue of the current processing unit;

4.2.2 In current exemplary embodiment, second order mode include spatial prediction (C-1) such as horizontal prediction, vertical prediction, DC prediction, diagonal up left prediction, diagonal down right prediction and some other directional prediction as well; or it could be prediction with different block size and some other similar process. The second prediction mode should not be constructed as being limited to the set forth herein.

4.2.3 Second order mode could be obtained using various information of current processing unit: calculate the directional function of picture pixel prediction value (D-1-2) of current processing unit using sobel operator and compare with predefined value (D-1-1) so that the second order mode is confirmed; The method should not be constructed as being limited to the set forth herein.

4.2.4 If the prediction used to generate the first order residue prediction value is spatial prediction, up and left adjacent pixel of current processing unit in the current frame will be used to generate the first order residue prediction value according to the second order mode.

4.2.5 Reconstructed second order residue and first order residue prediction value will be added to obtain the first order reside; reconstructed first order residue will be sent back to second prediction storage.

4.2.6 The spatial prediction (C-1) should not be constructed as being limited to the set forth herein and can include some other similar process in the background of invention.

4.3 According to the method introduced in the background of the invention, realizing first prediction and compensation in the first prediction apparatus and output reconstructed picture.

4.4 If spatial prediction is applied to generate first order residue prediction value, reconstructed first order residue of the up and left adjacent pixel will be stored in the second prediction storage.

5 Exemplary embodiment 5: a second order prediction decoding method, comprising following procedure:

5.1 Reading encoded information of second order residue and first order mode from the bit-stream. After entropy decoding, inverse transform and de-quantization, reconstructed second order residue, and first order mode will be obtained.

5.2 Realizing second prediction and compensation in the second prediction apparatus:

5.2.1 Applying spatial prediction (C-1) to the first order residue of the current processing unit;

5.2.2 In current exemplary embodiment, second order mode include spatial prediction (C-1) such as horizontal prediction, vertical prediction, DC prediction, diagonal up left prediction, diagonal down right prediction and some other directional prediction as well; or it could be prediction with different block size and some other similar process. The second prediction mode should not be constructed as being limited to the set forth herein.

5.2.3 Second order mode could be obtained using various information of D-1, D-2, D-3: calculate the directional function of picture pixel prediction value (D-1-2) of current processing unit using sobel operator and compare with that of related picture pixel prediction value in the reference picture of the current processing unit (D-3-2) so that the second order mode is confirmed; The method should not be constructed as being limited to the set forth herein.

5.2.4 If the prediction used to generate the first order residue prediction value is spatial prediction, up and left adjacent pixel of current processing unit in the current frame will be used to generate the first order residue prediction value according to the second order mode.

5.2.5 Reconstructed second order residue and first order residue prediction value will be added to obtain the first order reside; reconstructed first order residue will be sent back to second prediction storage.

5.2.6 The spatial prediction (C-1) should not be constructed as being limited to the set forth herein and can include some other similar process in the background of invention.

5.3 According to the method introduced in the background of the invention, realizing first prediction and compensation in the first prediction apparatus and output reconstructed picture.

5.4 If spatial prediction is applied to generate first order residue prediction value, reconstructed first order residue of the up and left adjacent pixel will be stored in the second prediction storage.

6 Exemplary embodiment 6: a second order prediction decoding method, comprising following procedure:

6.1 Reading encoded information of second order residue and first order mode from the bit-stream. After entropy decoding, inverse transform and de-quantization, reconstructed second order residue, and first order mode will be obtained.

6.2 Realizing second prediction and compensation in the second prediction apparatus:

6.2.1 Applying spatial prediction (C-1) to the first order residue of the current processing unit;

6.2.2 In current exemplary embodiment, second order mode include spatial prediction (C-1) such as horizontal prediction, vertical prediction, DC prediction, diagonal up left prediction, diagonal down right prediction and some other directional prediction as well; or it could be prediction with different block size and some other similar process. The second prediction mode should not be constructed as being limited to the set forth herein.

6.2.3 Second order mode could be obtained using various information of D-1, D-2, D-3: calculate the directional function of picture pixel prediction value (D-1-2) of current processing unit using sobel operator and then, calculate a function value with a predefined value of a current processing unit. In this exemplary embodiment, predefined value of current processing unit (D-1-1) is used as a scaling factor and compare with that of related picture pixel prediction value in the reference picture of the current processing unit (D-3-2) so that the second order mode is confirmed; the method should not be constructed as being limited to the set forth herein.

6.2.4 If the prediction used to generate the first order residue prediction value is spatial prediction, up and left adjacent pixel of current processing unit in the current frame will be used to generate the first order residue prediction value according to the second order mode.

6.2.5 Reconstructed second order residue and first order residue prediction value will be added to obtain the first order reside; reconstructed first order residue will be sent back to second prediction storage.

6.2.6 The spatial prediction (C-1) should not be constructed as being limited to the set forth herein and can include some other similar process in the background of invention.

6.3 According to the method introduced in the background of the invention, realizing first prediction and compensation in the first prediction apparatus and output reconstructed picture.

6.4 If spatial prediction is applied to generate first order residue prediction value, reconstructed first order residue of the up and left adjacent pixel will be stored in the second prediction storage.

7 Exemplary embodiment 6: a second order prediction encoding and decoding system, comprising following procedure:

7.1 a second order prediction encoding method, comprising following procedure:

7.1.1 Realizing first prediction in the first prediction apparatus: inputs the original picture, outputs first order residue to the second prediction apparatus and first order mode to encoder 7.1.2 Realizing second prediction and compensation in the second prediction apparatus:

7.1.2.1 Applying spatial prediction (C-2) to the first order residue of the current processing unit;

7.1.2.2 In current exemplary embodiment, second order mode include spatial prediction (C-1) such as horizontal prediction, vertical prediction, DC prediction, diagonal up left prediction, diagonal down right prediction and some other directional prediction as well; or it could be prediction with different block size and some other similar process. The second prediction mode should not be constructed as being limited to the set forth herein.

7.1.2.3 If the prediction used to generate the first order residue prediction value is spatial prediction, up and left adjacent pixel of current processing unit in the current frame will be used to generate the first order residue prediction value according to the second order mode.

7.1.2.4 The difference of first order residue and first order residue prediction value is second order residue 7.1.2.5 Mode decision for the second order mode (D-1-6): calculating the encoding cost of the available second order mode and selected the one with minimum cost. The method of calculating the encoding cost can refer to the background of the invention, and should not be constructed as being limited to the set forth herein 7.1.2.6 Encode the second order prediction mode into the bit-stream 7.1.2.7 After transform, quantization and entropy coding, encoder will generated encoded bit-stream, which includes encoded information of first order mode, second order mode and second order residue but no first order residue. This encoded information is generated by lossy encoding. By inverse procedure, reconstructed second order residue could be obtained; the process of generating the bit-stream should not be constructed as being limited to the set forth herein 7.1.2.8 The spatial prediction (C-1) should not be constructed as being limited to the set forth herein and can include some other similar process in the background of invention.

7.1.2.9 After second order decoding process, reconstructed first order residue will be obtained from reconstructed second order residue and sent back to second prediction storage.

7.1.3 If spatial prediction is applied to generate first order residue prediction value, reconstructed first order residue of the up and left adjacent pixel will be stored in the second prediction storage 7.2 a second order prediction decoding method, comprising following procedure:

7.2.1 Reading encoded information of second order residue, second order mode and first order mode from the bit-stream. After entropy decoding, inverse transform and de-quantization, reconstructed second order residue, second order mode (D-1-7) and first order mode will be obtained.

7.2.2 In current exemplary embodiment, second order mode include spatial prediction (C-1) such as horizontal prediction, vertical prediction, DC prediction, diagonal up left prediction, diagonal down right prediction and some other directional prediction as well; or it could be prediction with different block size and some other similar process. The second prediction mode should not be constructed as being limited to the set forth herein.

7.2.3 If the prediction used to generate the first order residue prediction value is spatial prediction, up and left adjacent pixel of current processing unit in the current frame will be used to generate the first order residue prediction value according to the second order mode.

7.2.4 Reconstructed second order residue and first order residue prediction value will be added to obtain the first order reside; reconstructed first order residue will be sent back to second prediction storage.

7.2.5 The spatial prediction (C-1) should not be constructed as being limited to the set forth herein and can include some other similar process in the background of invention.

7.3 According to the method introduced in the background of the invention, realizing first prediction and compensation in the first prediction apparatus and output reconstructed picture.

7.4 If spatial prediction is applied to generate first order residue prediction value, reconstructed first order residue of the up and left adjacent pixel will be stored in the second prediction storage.

Figure 6:
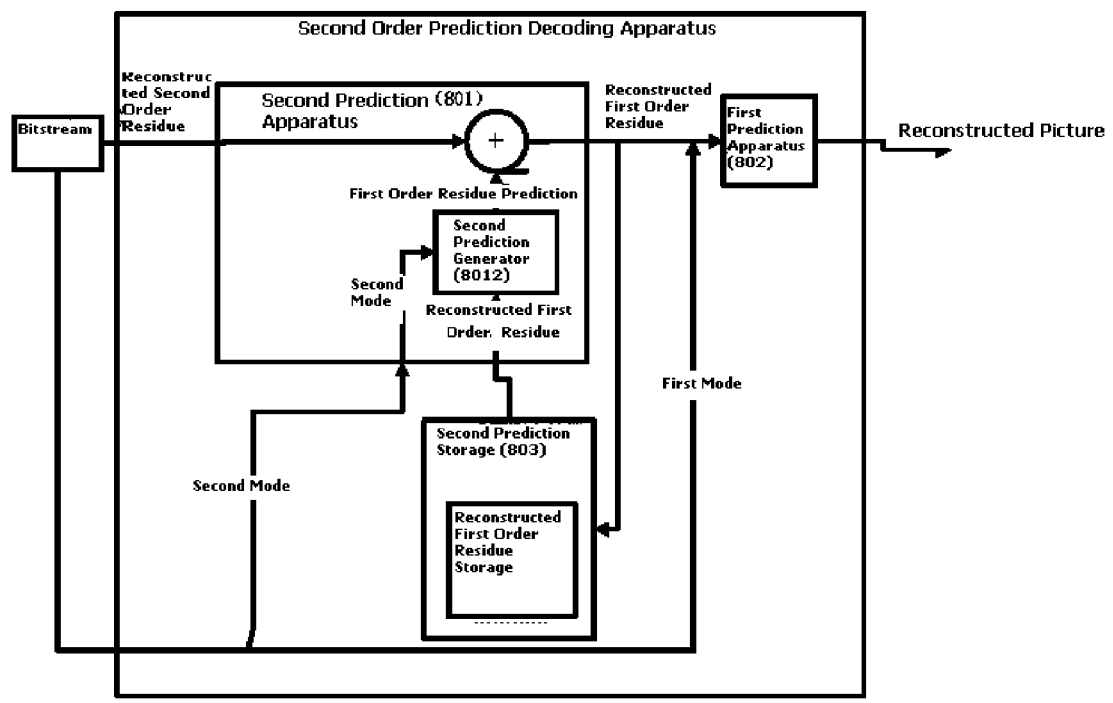
FIG. 6 is a diagram of second order prediction decoder according to an exemplary embodiment of the present invention

8 Exemplary embodiment 8: a second order prediction decoding apparatus comprising (FIG. 6):

8.1 Bit-stream decoding apparatus: reading encoded information of second order residue, second order mode and first order mode from the bit-stream. After entropy decoding, inverse transform and de-quantization, reconstructed second order residue, second order mode (D-1-7) and first order mode will be obtained.

8.2 Realizing second prediction and compensation in the second prediction apparatus:

8.2.1 Applying spatial prediction (C-1) to the first order residue of the current processing unit;

8.2.2 In current exemplary embodiment, second order mode include spatial prediction (C-1) such as horizontal prediction, vertical prediction, DC prediction, diagonal up left prediction, diagonal down right prediction and some other directional prediction as well; or it could be prediction with different block size and some other similar process. The second prediction mode should not be constructed as being limited to the set forth herein.

8.2.3 If the prediction used to generate the first order residue prediction value is spatial prediction, up and left adjacent pixel of current processing unit in the current frame will be used to generate the first order residue prediction value according to the second order mode.

8.2.4 Reconstructed second order residue and first order residue prediction value will be added to obtain the first order reside; reconstructed first order residue will be sent back to second prediction storage.

8.2.5 The spatial prediction (C-1) should not be constructed as being limited to the set forth herein and can include some other similar process in the background of invention.

8.3 In the first prediction apparatus, according to the method introduced in the background of the invention, realizing first prediction and compensation and output reconstructed picture.

8.4 Second prediction storage: if spatial prediction is applied to generate first order residue prediction value, reconstructed first order residue of the up and left adjacent pixel will be stored in the second prediction storage.

Figure 7:
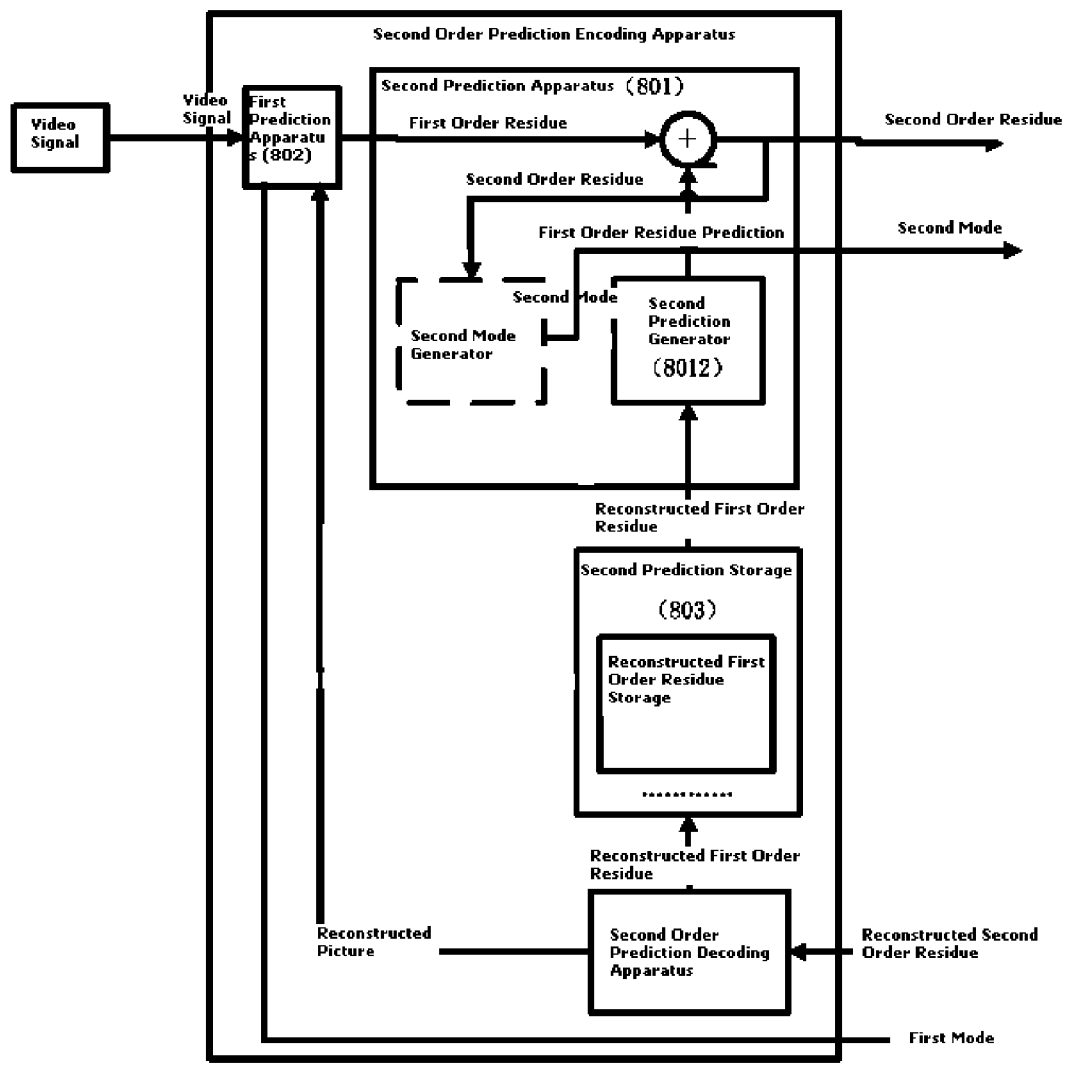
FIG. 7 is a diagram of second order prediction decoder according to an exemplary embodiment of the present invention

9 Exemplary embodiment 8: a second order prediction encoding apparatus comprising (FIG. 7):

9.1 First prediction apparatus: Realizing first prediction in the first prediction apparatus: inputs the original picture, outputs first order residue to the second prediction apparatus and first order mode to encoder 9.2 Realizing second prediction and compensation in the second prediction apparatus:

9.2.1 Applying temporal prediction (C-2) to the first order residue of the current processing unit;

9.2.2 In current exemplary embodiment, second order mode includes temporal prediction (C-2) such as forward prediction, backward prediction, bi-predictive prediction with variable block size; or it could be prediction with different block size and some other similar process. The second prediction mode should not be constructed as being limited to the set forth herein.

9.2.3 If the prediction used to generate the first order residue prediction value is temporal prediction, reconstructed first order residue of the reference picture correspondent to the current processing block will be used to generate the first order residue prediction value using motion estimation.

9.2.4 The difference of first order residue and first order residue prediction value is second order residue 9.2.5 Mode decision for the second order mode (D-1-6): calculating the encoding cost of the available second order mode and selected the one with minimum cost. The method of calculating the encoding cost can refer to the background of the invention, and should not be constructed as being limited to the set forth herein.

9.2.6 Encode the second order prediction mode into the bit-stream 9.2.7 After transform, quantization and entropy coding, encoder will generated encoded bit-stream, which includes encoded information of first order mode, second order mode and second order residue but no first order residue. This encoded information is generated by lossy encoding. By inverse procedure, reconstructed second order residue could be obtained; the process of generating the bit-stream should not be constructed as being limited to the set forth herein.

9.2.8 The temporal prediction (C-2) should not be constructed as being limited to the set forth herein and can include some other similar process in the background of invention.

9.2.9 After second order decoding process, reconstructed first order residue will be obtained from reconstructed second order residue and sent back to second prediction storage.

9.3 Second prediction storage: If temporal prediction is applied to generate first order residue prediction value, reconstructed first order residue of the reference picture correspondent to the current processing unit will be stored in the second prediction storage.

What is claimed is:

1. A second order prediction decoding method comprising:
providing a dual prediction and compensation step comprising a first prediction and compensation substep and a second prediction and compensation substep
inputting reconstructed first order residue and reconstructed second order residue to the second prediction and compensation substep, the second prediction and compensation substep comprising:
generating first order residue prediction value by the reconstructed first order residue, which are stored in a second prediction storage unit, by using prediction process according to a second order mode;
combining the reconstructed second order residue and the first order residue prediction value to derive the reconstructed first order residue;
inputting the reconstructed first order residue to the first prediction and compensation substep; and
outputting the reconstructed picture.

2. The second order prediction decoding method of claim 1, wherein the second order mode is one of spatial prediction or temporal prediction or combination of both.

3. The second order prediction decoding method of claim 2, wherein second order mode is derived from one or more of the following information at one or more of the following locations:
location:
(1) current processing unit,
(2) neighboring unit of current processing unit, and
(3) available reference picture of the current picture in which current processing unit located;
information:
(1) predefined value,
(2) reconstructed picture pixel value,
(3) picture pixel prediction value,
(4) reconstructed first order residue,
(5) first order residue prediction value,
(6) first order mode,
(7) reconstructed second order residue,
(8) second order mode, and
(9) second order mode syntax elements in the bit-stream.

4. The second order prediction decoding method of claim 1, wherein the second prediction storage unit satisfies at least one of the following conditions:
(1) when spatial prediction is applied to derive first order residue prediction value, part or all of reconstructed first order residue of the neighboring unit of the current processing unit is stored in the second prediction storage;
(2) when temporal prediction is applied to derive first order residue prediction value, reconstructed first order residue of the available reference picture of the current picture in which current processing unit located; and
(3) when spatial and temporal prediction is applied to derive first order residue prediction value, part or all of reconstructed first order residue of the neighboring unit of the current processing unit is stored in the second prediction storage, so is reconstructed first order residue of the available reference picture of the current picture in which current processing unit located.

5. A second order prediction decoding apparatus using the second order prediction decoding method of claim 1 comprising:
a second prediction apparatus (801), which inputs reconstructed second order residue decoded from bit-stream and reconstructed first order residue from second prediction storage (803) and outputs reconstructed first order residue;
the second prediction storage (803), which inputs reconstructed first order residue from second prediction apparatus (801) and outputs reconstructed first order residue; and
a first prediction apparatus (802), which inputs reconstructed first order residue from second prediction apparatus (801) and first order mode decode from bit-stream and outputs reconstructed picture.

6. A second order prediction encoding method comprises:
providing a second order prediction step comprising a first prediction substep and a second prediction substep;
inputting an original picture to the first prediction substep;
generating first order residue by the first prediction substep;
inputting the first order residue and reconstructed first order residue to the second prediction substep wherein the reconstructed first order residue being stored in a second prediction storage;
generating second order residue by the second prediction substep which comprises:
generating a first order residue prediction value by the reconstructed first order residue by using prediction according to a second order mode, and
combining the first order residue and the first order residue prediction value to derive the second order residue;
outputting the second order residue.

7. The second order prediction encoding method of claim 6, wherein the second order mode is one of spatial prediction or temporal prediction or combination of both.

8. The second order prediction decoding method of claim 7, wherein second order mode is derived from one or more of the following information at one or more of the following locations:

location:
(1) current processing unit,
(2) neighboring unit of current processing unit, and
(3) available reference picture of the current picture in which current processing unit located;
information:
(1) predefined value,
(2) reconstructed picture pixel value,
(3) picture pixel prediction value,
(4) reconstructed first order residue,
(5) first order residue prediction value,
(6) first order mode,
(7) reconstructed second order residue,
(8) second order mode, and
(9) second order mode syntax elements in the bit-stream.

9. The second order prediction encoding method of claim 6, wherein the second prediction storage satisfy at least one of the following:
(4) when spatial prediction is applied to derive first order residue prediction value, part or all of reconstructed first order residue of the neighboring unit of the current processing unit is stored in the second prediction storage;
(5) when temporal prediction is applied to derive first order residue prediction value, reconstructed first order residue of the available reference picture of the current picture in which current processing unit located; and
(6) when spatial and temporal prediction is applied to derive first order residue prediction value, part or all of reconstructed first order residue of the neighboring unit of the current processing unit is stored in the second prediction storage, so is reconstructed first order residue of the available reference picture of the current picture in which current processing unit located.

10. The second order prediction encoding method of claim 6, wherein the corresponding bit-stream includes one of the following:
(1) a first order mode and the second order residue, not including the first order residue;
(2) a first order mode, the second order mode and the second order residue, not including the first order residue.

11. A second order prediction encoding apparatus using the second order prediction encoding method of claim 6 comprising:
a first prediction apparatus (802), which inputs original picture and reconstructed picture and outputs first order residue and first order mode;
a second prediction apparatus (801), which inputs first order residue from first prediction apparatus (802) and reconstructed first order residue from second prediction storage (803) and outputs second order residue; and
a second prediction storage (803), which inputs reconstructed first order residue and outputs reconstructed first order residue.

\* \* \* \* \*